United States Patent Office 3,266,991
Patented August 16, 1966

3,266,991
PHARMACEUTICAL PREPARATIONS OF 1-DEHY-DRO-TESTOSTERONE UNDECYCLENATE
Albert Wettstein, Riehen, and Georg Anner and Ludwig Ehmann, Basel, Switzerland, assignors to Ciba Corporation, New York, N.Y., a corporation of Delaware
No Drawing. Filed Feb. 26, 1965, Ser. No. 435,687
Claims priority, application Switzerland, Apr. 14, 1961, 4,433/61
4 Claims. (Cl. 167—74)

This is a continuation-in-part of application Serial No. 186,365, filed April 10, 1962, now abandoned.

The present invention relates to the therapeutically active undecylenate of 1-dehydro-testosterone.

After having been injected once intramuscularly in high doses in the castrated male rat this ester displays a high and protracted androgenic and anabolic effect and is distinctly superior in this respect to other 1-dehydro-testosterone esters, such as the propionate, isobutyrate, trimethylacetate, valerate and others. It offers certain advantages also in comparison with known highly active androgenic-anabolic testosterone derivatives: thus, for example, compared with 19-nor-testosterone phenyl propionate in a tenfold dose in the above mentioned test on the rat, it is substantially equivalent insofar as the intensity of the anabolic and androgenic effect is concerned, but its androgenic effect persists for a longer period. In moderate doses, however, the androgenic action is weak and the anabolic activity preponderates, and the dissociation of these two effects becomes very pronounced some seven days after administration of the substance. For instance, if the ester is given intramuscularly to castrated male rats in a single dose of 100 mg./kg. per body weight and the androgenic and anabolic effects are evaluated by the classical seminal vesicles and levator ani muscle tests, the maximum restitution of weight expressed in percent of the total restitution is attained on about the 9th day in the case of the seminal vesicles and is equal to 40% and this value is not exceeded, whereas the restitution of the levator ani muscle is 63% on the same day and increases continuously in the following period, attaining a complete 100% restitution of the organ weight on about the 15th day after injection.

Related compounds, for instance, testosterone undecylenate does not show such dissociation, the development of the androgenic effect following closely that of the anabolic effect and eventually exceeding the latter on about the 15th day.

The dissociation of the two effects in the 1-dehydro-testosterone undecylenate is not apparent in the cock's comb test, in which a very strong growth of the comb, simulating merely a pronounced androgenic effect, probably results from the addition of both the androgenic and anabolic effects of the substance.

By choosing an appropriate dosage, the ester of the present invention is thus a very suitable anabolic agent of long duration of action for use in all cases in which an outstanding androgenic effect must be avoided. However, in a high dosage it can also be used as an excellent therapeutic agent in all cases in which a high and protracted androgenic effect, combined with a good anabolic effect is desired. It can be used e.g., in veterinary medicine.

The ester of the present invention can be prepared by a known method, advantageously, for example, by esterifying 1-dehydro-testosterone in known manner with undecylenic acid. For this purpose 1-dehydro-testosterone is reacted with the undecylenic acid in the presence of an esterifying condensing agent, such for example, as a strong mineral acid for example, sulfuric, hydrochloric, trifluoracetic, para-toluenesulfonic acid or the like, in an anhydrous medium; or alternatively a functional derivative of undecylenic acid, preferably a halide thereof, is used which is reacted, if desired in the presence of a basic condensing agent, such as a tertiary base, preferably pyridine, with 1-dehydro-testosterone in a suitable solvent or diluent. According to another, likewise preferred method for the manufacture of the new ester the starting material used is the known undecylenate of testosterone or of dihydro-testosterone and the 1:2- or 1:2- and 4:5-double bonds are introduced in known manner. For example, the dehydrogenating agent used is selenium dioxide in a tertiary aliphatic alcohol, such as tertiary amyl alcohol, if desired in the presence of a tertiary base such as pyridine; alternatively, the dehydrogenation may be carried out with a quinone, for example 2:3-dicyano-5:6-dichlorobenzoquinone.

Likewise suitable are microbiological methods; for example the dehydrogenation of testosterone undecylenate may be performed by incubation with fungi of the species *Corynebacterium simplex* or *Didymella lycopersici* by the method described in the literature.

For administration preparations are manufactured by known methods containing the aforesaid ester in conjunction with solid or liquid excipients, for example in conjunction with organic or inorganic pharmaceutical excipients suitable for parenteral, enteral or local administration. Suitable excepients are substances that do not react with the ester such, for example, as water, vegetable oils, benzyl alcohols, polyethylene glycols, gelatine, lactose, starch, magnesium stearate, talc, white petroleum jelly, cholesterol or other known medicinal excipients. More especially preparations are made for parenteral administration, preferably solutions, in the first place oily or aqueous solutions, also suspensions, emulsions or depot preparations; for enteral administration there are formulated in a similar manner also tablets or dragées, and for local administration also ointments or creams. The preparations may be sterilized and/or may contain assistants such as preserving, stabilizing, wetting or emulsifying agents, salts for regulating the osmotic pressure, or buffers. These preparations contain preferably 0.05 to 500 mg. of the active principle per unit dose such as an ampoule or tablet of from 0.005% to 70%.

The following examples illustrate the invention.

*Example 1*

55 grams of undecylenic acid chloride are added dropwise within 30 minutes at room temperature under nitrogen into a stirred solution of 57.3 grams of $\Delta^{1,4}$-androstadiene-17$\beta$-ol-3-one in 200 cc. of dimethyl-formamide. The mixture is then stirred on at room temperature under nitrogen and after 23 hours the starting material [$\Delta^{1,4}$-androstadiene-17$\beta$-ol-3-one] can no longer be detected in the reaction solution by means of a thin layer chromatogram. The reaction solution is diluted with ether, then repeatedly washed with dilute hydrochloric acid, dilute ice-cold sodium hydroxide solution and water, dried over sodium sulfate and evaporated in a water-jet vacuum. Yield: 77.5 grams of crude $\Delta^{1,4}$-androstadiene-17$\beta$-ol-3-one-undecylenate. The thickish, yellow oil is dissolved in 1 liter of hexane and absorbed on 1500 grams of alumina of activity III in hexane. Elution is performed successively with hexane, then with hexane+benzene 1:1 and with benzene, to yield as the main fraction 56.6 grams of $\Delta^{1,4}$-androstadiene-17$\beta$-ol-3-one-undecylenate as a viscid yellowish oil. Ultra-violet absorption spectrum (in absolute alcohol): $\lambda_{max}$ 244 m$\mu$ ($\epsilon$=15,600–16,400). Optical rotation $[\alpha]_D^{27°}=+26.9°$ (c.=1.27% in dioxane).

Example 2

A mixture of 4.54 grams of $\Delta^4$-androstene-17β-ol-3-one-undecylenate (testosterone undecylenate), 200 cc. of tertiary amyl alcohol and 5.0 cc. of glacial acetic acid is treated with 6.0 grams of mercury, and while refluxing and continuously stirring under nitrogen a solution of 3.70 grams of selenium dioxide in 165 cc. of tertiary amyl alcohol is added dropwise and the whole is refluxed for 20 hours. To free the cooled reaction solution from precipitated selenium, mercury selenide and mercury, it is filtered, diluted with ethyl acetate and repeatedly agitated with ammonium sulfide solution and sodium carbonate solution, washed with water, dried over sodium sulfate and evaporated. Yield: 4.1 grams of crude $\Delta^{1,4}$-androstadiene-17β-ol-3-one - undecylenate as a thick, brownish oil which is dissolved in hexane and adsorbed on alumina of activity III in hexane. Elution with hexane, with hexane+benzene 1:1 and with benzene yields 3.2 grams of $\Delta^{1,4}$-androstadiene-17β-ol-3-one-undecylenate.

Example 3

A solution of 4.5 grams of androstane-17β-ol-3-one-undecylenate in 200 cc. of tertiary amyl alcohol and 5.0 cc. of glacial acetic acid is treated with 12.0 grams of mercury and while refluxing and vigorously stirring the mixture it is treated under nitrogen, dropwise, with a solution of 7.4 grams of selenium dioxide in 330 cc. of tertiary amyl alcohol. The whole is then refluxed and stirred on for 20 hours under nitrogen. The reaction solution is cooled, the precipitated selenium, mercury selenide and mercury are filtered off, the filtrate is diluted with ethyl acetate and the ethyl acetate solution is repeatedly thoroughly washed with ammonium sulfide solution and sodium carbonate solution, dried and evaporated. The resulting crude $\Delta^{1,4}$-androstadiene-17β-ol-3-one-undecylenate is dissolved in hexane and adsorbed on alumina of activity III in hexane. Elution with hexane, with a 1:1 mixture of hexane and benzene, and with benzene yields 2.7 grams of $\Delta^{1,4}$-androstadiene-17β-ol-3-one-undecylenate.

The androstane-17β-ol-3-one-undecylenate is prepared in the following manner: A solution of 3.11 grams of androstane-17β-ol-3-one in 50 cc. of dimethyl-formamide is mixed with a solution of 5.0 grams of undecylenic acid chloride in 10 cc. of dimethylformamide with stirring under nitrogen, and the mixture is then stirred for 1 hour at an internal temperature of 75 to 80° C. The clear solution is diluted with ether and then repeatedly washed with water, with dilute ice-cold sodium hydroxide solution and with water, dried and evaporated. Yield: 4.5 grams of crude androstane-17β-ol-3-one-undecylenate which is dissolved in hexane and adsorbed on alumina of activity III in hexane. Elution with hexane is followed by evaporation, to yield 3.98 grams of androstane-17β-ol-3-one-undecylenate as a yellowish oil which does not crystallize. Infra-red absorption (in methylene chloride): 5.84μ (ester), 6.08μ (terminal double bond of undecylenic acid).

Example 4

A mixture of 6.6 grams of testosterone undecylenate, 4.0 grams of 2:3-dicyano-5:6-dichlorobenzoquinone and 50 cc. of dry benzene is stirred for 10 hours at the boil under nitrogen, then cooled, diluted with ether and the precipitate—2:3-dicyano-5:6-dichloro - hydroquinone—is suctioned off. The filtrate is washed with dilute ice-cold sodium hydroxide solution and with water, dried over sodium sulfate and completely evaporated on a water bath under vacuum. Yield: 6.4 grams of crude $\Delta^{1,4}$-androstadiene-17β-ol-3-one - undecylenate which is dissolved in hexane and adsorbed on alumina of activity III in hexane. Elution with hexane, then with a 1:1 mixture of hexane and benzene, and with benzene, followed by evaporation, furnishes 4.5 grams of $\Delta^{1,4}$-androstadiene-17β-ol-3-one-undecylenate.

Example 5

1-dehydro-testosterone undecylenate can be used for the manufacture of pharmaceutical preparations, for example in the form of ampoules, in the following manner: 100 mg. of 1-dehydro-testosterone undecylenate are dissolved in 5 ccm. of pure acetone, the acetone is then evaporated, the residue is dissolved by heating for two hours in purified sesame oil and the volume of the solution is made up to 10 ccm. The solution is then filtered through a sterilized glass sinter suction filter having large pores, charged into 10 l ccm. ampoules and the latter are then sterilized in conventional manner.

What is claimed is:
1. 1-dehydro-testosterone undecylenate.
2. Pharmaceutical preparations containing as the active ingredient 1-dehydro-testosterone undecylenate together with a member selected from the group consisting of a carrier suitable for enteral, parenteral and topical administration, said active ingredient being present in an amount ranging from 0.05 to 500 mg. per unit dose.
3. Pharmaceutical preparations as claimed in claim 2 in the form of oleaginous solutions.
4. Pharmaceutical preparations as claimed in claim 2 containing the active ingredient in an amount from 0.005 to 70% by weight.

References Cited by the Examiner
UNITED STATES PATENTS 2,837,464  6/1958  Nobile _____ 195—51
2,923,721  2/1960  Joly et al. _____ 260—397.4

OTHER REFERENCES

Gould et al.: "Journ. of Amer. Chem. Soc." (1957), vol. 79, pp. 4472–4475.

LEWIS GOTTS, *Primary Examiner.*

ELBERT LEE ROBERTS, *Assistant Examiner.*